(12) United States Patent
Dinev

(10) Patent No.: US 9,319,575 B2
(45) Date of Patent: Apr. 19, 2016

(54) ILLUMINATION APPARATUS WITH INTEGRATED POWER PROVISION

(71) Applicant: Imperx, Inc., Boca Raton, FL (US)

(72) Inventor: Petko Dimitrov Dinev, Boca Raton, FL (US)

(73) Assignee: IMPERX, INC., Boca Raton, FL (US)

( * ) Notice: Subject to any disclaimer, the term of this patent is extended or adjusted under 35 U.S.C. 154(b) by 39 days.

(21) Appl. No.: 14/479,454

(22) Filed: Sep. 8, 2014

(65) Prior Publication Data

US 2016/0072990 A1 Mar. 10, 2016

(51) Int. Cl.
*H04N 5/225* (2006.01)
*H05B 37/02* (2006.01)
*H04N 5/232* (2006.01)
*G03B 15/05* (2006.01)
*H04N 5/235* (2006.01)

(52) U.S. Cl.
CPC ............. *H04N 5/2256* (2013.01); *G03B 15/05* (2013.01); *H04N 5/2252* (2013.01); *H04N 5/2354* (2013.01); *H04N 5/23203* (2013.01); *H04N 5/23241* (2013.01); *H05B 37/0263* (2013.01); *H05B 37/0272* (2013.01)

(58) Field of Classification Search
CPC ............ H04N 5/2256; H04N 5/23203; H04N 5/23241; G06K 2209/401; G06K 9/2027; G03B 9/70; G03B 15/04; G03B 7/16; G03B 29/00; G03B 2215/05; G03B 15/02; G03B 2215/0557; G03B 15/05; H05B 37/0263

USPC .................... 348/370, 371; 396/155; 250/214
See application file for complete search history.

(56) References Cited

U.S. PATENT DOCUMENTS

| | | | |
|---|---|---|---|
| 5,010,412 A | 4/1991 | Garriss | |
| 6,483,254 B2 | 11/2002 | Vo et al. | |
| 7,095,187 B2 | 8/2006 | Young | |
| 7,208,881 B2 | 4/2007 | Young | |
| 8,773,276 B2 * | 7/2014 | Savage, Jr. ............... | G08B 5/38 340/332 |
| 2002/0101189 A1 | 8/2002 | Vo et al. | |
| 2005/0128097 A1 * | 6/2005 | Piccolo, III .............. | G08B 1/08 340/691.1 |
| 2005/0157205 A1 * | 7/2005 | Voss ..................... | H04N 5/2354 348/370 |
| 2011/0128436 A1 | 6/2011 | Ohsuga et al. | |

* cited by examiner

*Primary Examiner* — Nelson D. Hernández Hernández
(74) *Attorney, Agent, or Firm* — Jon A. Gibbons; Fleit Gibbons Gutman Bongini & Bianco PL

(57) ABSTRACT

Power for an illumination device and a camera is provided from power integrated onto a data cable between a controller/computer and the light illumination device. The camera-controller/computer interface includes one of GEV with PoE, USB and CXP, where a power is provided within the data interface cable, and the distance between the camera and the controller/computer is very long. In order to avoid running multiple long cables in a production manufacturing environment, a power extraction module is incorporated into a light illuminator, in order to extract the power for the interface cable, and to generate the individual powers for the light illuminator and the camera. In cases where the interface standard does not provide integrated power, power can be injected to the cable and extracted from the light illumination module.

20 Claims, 4 Drawing Sheets

ILLUMINATION APPARATUS WITH INTEGRATED POWER PROVISION

BACKGROUND

The present description generally relates to image illumination and image capturing processes and devices.

Almost every modern manufacturing process or apparatus uses machine vision systems. These systems ensure fast, accurate and repeatable results, and thus guaranteeing a consistent quality over time. The main components of every machine vision systems is an image capturing camera apparatus comprising of a CCD or CMOS image sensor, and a light illuminator comprising which may include LED illuminators, a control circuit, and an external power supply. The camera and the light illuminator require an external power for operation. The distance between camera and the illuminator may be very short. In some examples, the illuminator may be physically attached to the camera. However, the distance between the camera and the host computer or controller may be very long. In case of a GEV or CXP interface between the controller and the camera, the length of the cable can be up to 100 meters or longer. In addition, in most cases the input voltage requirements for the camera and the light illuminator are different. For example, 24V for the illuminator while 12V may be used for the camera. This results in three long cables to support a single camera system, two cables for power and one cable for data. This adds wiring challenges, especially if the cables have to be routed through tight places in a production or assembly line environment, which is very common on the manufacturing floor. In addition to occupying space in a tight environment, the result adds costs for material and labor in the installation as well as maintenance of the system over time.

SUMMARY

A light illumination apparatus comprises: a first connector adapted to receive an integrated power and data stream from an external controller, the integrated power and data stream having a source power component at a source voltage combined with a data stream component on a conductor of the first connector; an illumination module generating light upon receiving a first power component at a first voltage; a second connector adapted to communicate the data stream component with an external camera apparatus for modulating the data stream component with a digital representation of a received image upon receiving operating power from a second power component; a power extraction module coupled to the first connector, the second connector, and the illumination module, the power extraction module adapted to extract the source power component from the integrated power and data stream, extract the data stream component from the integrated power and data stream, communicate the data stream component between the first connector and the second connector, convert a first portion of the source power component to the first power component at the first voltage, apply the first power component to the illumination module, supply a second portion of the source power component to the second power component, provide the second power component to the external camera apparatus; and a housing adapted to house the first connector, the illumination module, the second connector, and the power extraction module.

A system comprises: an external controller having a first controller connector having a first integrated power and data stream, and a second controller connector having a second integrated power and data stream; a first light illumination apparatus coupled to the first controller connector and adapted to illuminate a first object by consuming a first portion of first power received from the first integrated power and data stream, and to generate a first camera power by consuming a second portion of first power received from the first integrated power and data stream; a first long cable for coupling the first integrated power and data stream between the first controller connector and the first light illumination apparatus; a first camera apparatus coupled to the first light illumination apparatus and adapted to generate a digitized first image of the first object illuminated by the first light illumination apparatus by consuming the first camera power received from the first light illumination apparatus; a first short data cable for coupling a first data stream component of the first integrated power and data stream between the first camera apparatus and the first light illumination apparatus, the first camera apparatus further adapted to modulate the digitized first image upon the first data stream component for communication to the external controller; a first short power cable for coupling the first camera power from the first light illumination apparatus to the first camera apparatus, wherein a length of the first long cable is at least one hundred times greater than a length of the first short power cable; a second light illumination apparatus coupled to the second controller connector and adapted to illuminate a second object by consuming a first portion of second power received from the second integrated power and data stream, and to generate second camera power by consuming a second portion of second power received from the second integrated power and data stream; a second long cable for coupling the second integrated power and data stream between the second controller connector and the second light illumination apparatus; a second camera apparatus coupled to the second light illumination apparatus and adapted to generate a digitized second image of the second object illuminated by the second light illumination apparatus by consuming the second camera power received from the second light illumination apparatus; a second short data cable for coupling a second data stream component of the second integrated power and data stream between the second camera apparatus and the second light illumination apparatus, the second camera apparatus adapted to modulate the digitized second image upon the second data stream component for communication to the external controller; and a second short power cable for coupling the second camera power from the second light illumination apparatus to the second camera apparatus, wherein a length of the second long cable is at least one hundred times greater than a length of the second short power cable.

A method performed within a housing of a light illumination apparatus comprises: receiving an integrated power and data stream from an external controller at a first connector of the light illumination apparatus, the integrated power and data stream having a source power component at a source voltage and a data stream component, the source power component and the data stream component integrated on a conductor of the first connector; separating the source power component and the data stream component from the integrated power and data stream; communicating the data stream component to a second connector for coupling the data stream component to an external camera apparatus; converting a first portion of the source power component to a first power component at a first voltage; applying the first power component to an illumination module for illuminating an object; converting a second portion of the source power component to a second power component at a second voltage different from the first voltage and different from the source voltage; providing the second power component to the external camera apparatus, the external camera apparatus able to receive an image of the object, produce a digitized image of the object, and modulate the digitized image of the object upon the data stream component; and communicating the data stream component including the digitized image of the object from the second connector to the first connector.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various examples and to explain various principles and advantages all in accordance with the present description, in which.

DETAILED DESCRIPTION

Figure 1:
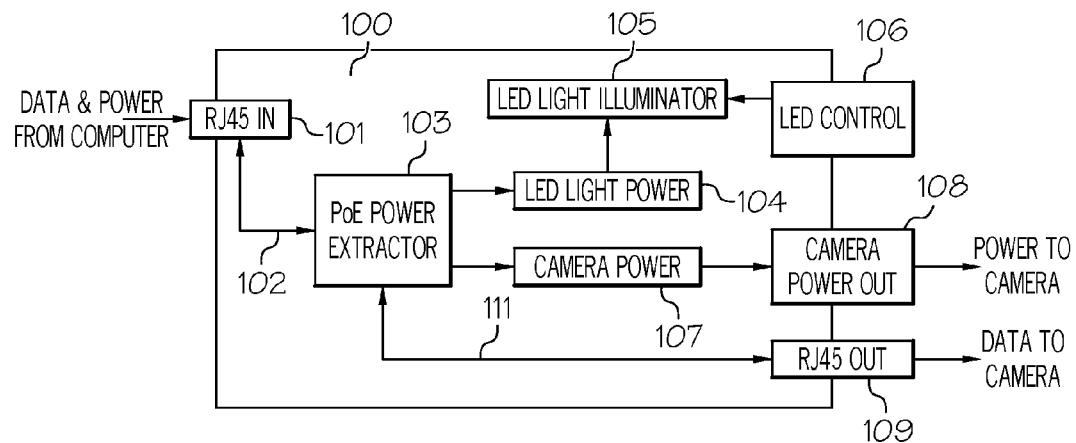
FIG. 1 shows a block diagram of a light illumination apparatus where the interface between the computer and the camera is GigE with PoE.

As required, detailed examples are disclosed herein; however, it is to be understood that the materials disclosed are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present disclosure is presented for purposes of illustration, but is not intended to be exhaustive or limited in the form disclosed. Many modifications and variations will be apparent without departing from the scope of the description. The examples are chosen and described in order to best explain the principles of the description and the practical application, and to enable others to understand the description for various examples with various modifications as are suited to the particular use contemplated.

Accordingly, the present description provides an apparatus and method for light illumination where the power for the illumination device and the camera is provided directly from the power integrated into the data cable between the computer and the light illumination device.

In applications, where the camera-controller/host computer interface includes an integrated power and data stream such as GEV with PoE (see IEEE 802.3), Universal Serial Bus (USB) or CoaXPress (CXP), where a power is provided within the data interface cable, the distance between the camera and the computer may be very long. In order to avoid running multiple long cables to the camera and the light illumination apparatus, it is advantageous to combine a power extraction module with the light illumination apparatus. The power extraction module extracts the power from the integrated power and data stream and generates the individual powers for the light illuminator itself and the camera. In the case of GEV with PoE the maximum power transmitted via the network cable is 25 W. In case of a CXP, the maximum power transmitted via the coaxial cable is 15 W, and in case of USB 3.0 the power transmitted via the USB cable is 10 W. In all cases this power will be sufficient to supply the light illuminator and the camera. In cases where the interface standard do not provide integrated power, a power can be injected to the cable and extracted from the light illumination module.

According to one example, the interface between the camera and the controller/host computer is GEV with PoE. The integrated power and data stream, transmitted via a single long network cable from the host computer with the standard GigE with PoE is received from the input RJ45 connector. The power extraction module senses the voltage from the computer and converts it to a DC voltage with a predetermined value—36V for example. The actual value of the voltage depends on the particular camera and illuminator configuration. The data is transmitted directly to and output including a second RJ45 connector and sent to the camera via a short data cable. An illumination power module converts the incoming voltage from power extraction module to a voltage suitable for an LED illuminator—typically 24V. The LED illuminator converts the incoming voltage to light with the means of at least one LED. The spectrum of the irradiated light depends on the particular application and can be UV, Visible or IR. An LED control connector provides an external signal which can modulate the light intensity by controlling the current flowing into LEDs, switching the ON or OFF, or using Pulse Width Modulation (PWM) approach. A camera power module converts the incoming voltage from the power extraction module to a voltage suitable for the camera operation—typically 12V. The actual voltages generated by the different modules can be selected based on the particular application. The output voltage generated in camera module is supplied to the camera via a separate connector. In one example, the camera power module can serve as a PoE voltage injector and the camera voltage can be injected into the data signal thus forming a new PoE steam which will provide an integrated power and data to the camera.

FIG. 1 shows a block diagram of a light illumination apparatus where the interface between the computer and the camera is GigE with PoE. A first connector 101 is a RJ45 network connector and is attached to a light illuminator apparatus having a housing 100. A second connector 109 is a RJ45 network connector and is also connected to the light illuminator housing 100. A camera power output is available on a third connector 108 and a LED control connector 106 are also connected to the housing 100. In other examples, connectors 106 and 108 can share the same physical connector. A PoE (Power over Ethernet) extractor module 103 is connected form one side to the connector 101 via connection 102, and to a LED light power module 104, a camera power module 107, and to output connector 109 via connection 111. In some configurations the connection 102 and 111 can share the same connections. A LED Light illumination module 105, includes at least one LED and is connected to the LED power module 104 from one side and to the LED control connector 106. The LED module 105 is assembled in such way, that the LEDs are mounted on the housing 100 in such that their corresponding light emitting parts are facing outside of the housing. The individual LEDs in module 105 can be arranged in circular, linear or any other configuration, based on the particular application. The LED module 105 may comprise a constant current module to provide a constant current to the individual LEDs and thus to provide a constant illumination. The camera power module 107 is connected to the camera power output connector 108.

The integrated power and data stream, transmitted via a single network cable from the host computer with the standard GigE with PoE is received from connector 101. The power extraction module 103 senses the voltage from the integrated power and data stream and converts it to a DC source voltage with a predetermined value—36V for example. The actual value depends on the particular camera and LED illuminator 105 configuration. The data is coupled directly to output connector 109 and sent to the camera. The LED power module 104 converts the incoming source voltage from module 103 to a voltage suitable for the LED Illuminator 105—typically 24V. The LED Illuminator 105 converts the converted voltage to light with the means of at least one LED. The spectrum of the irradiated light depends on the particular application and can be UV, Visible or IR. The LED control connector 106 can provide an external signal which can modulate the light intensity by controlling the current flowing into LEDs, switching the LEDs ON or OFF, or using Pulse Width Modulation (PWM) approach to change the brightness. The camera power module 107 converts the incoming source voltage from module 103 to a voltage suitable for the camera operation—typically 12V. In some configurations the modules 104 and 107 can be integrated in one module or directly integrated individually or together in the module 103. The actual voltages generated by the modules 103, 104 and 107 can be selected based on the particular application. The output voltage generated in module 107 is supplied to the camera via connector 109. In another example, the camera power module 107 can serve as a PoE voltage injector and the camera voltage can be injected into the data signal thus forming a second PoE steam which will provide an integrated power and data stream to the camera.

Figure 2:
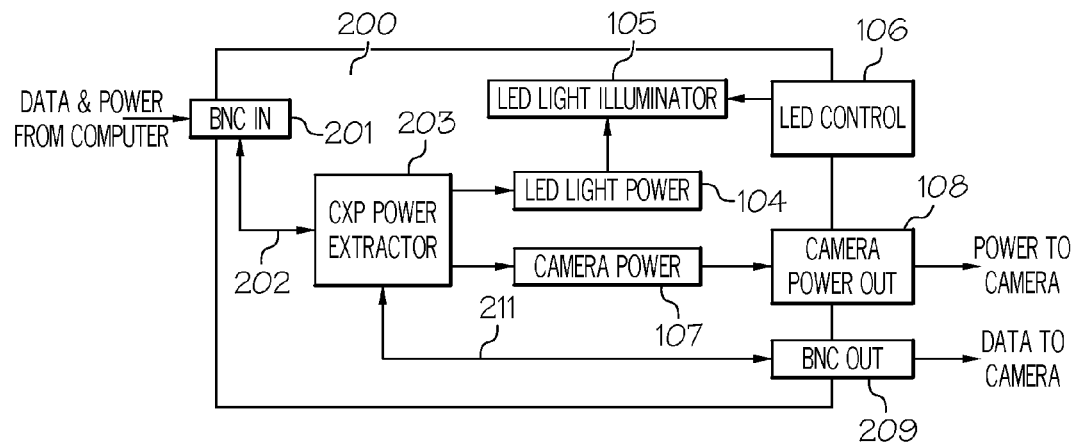
FIG. 2 shows a block diagram of a light illumination apparatus where the interface between the computer and the camera is CXP.

FIG. 2 shows a block diagram of a light illumination apparatus where the interface between the computer and the camera is CXP. FIG. 2 shows a modified example from of the structure of FIG. 1. In FIG. 2, like parts, which correspond to those in FIG. 1, are marked with the same reference numbers. In this example a first BNC connector 201 is connected to a light illuminator housing 200. A second BNC connector 209 is also connected to the light illuminator housing 200. A camera power connector 108 and a LED control connector 106 are also connected to the housing 200. Connectors 106 and 108 can share the same physical connector. A CXP (CoaxPress) extractor module 203 is connected form one side to the connectors 201 via connection 202, and to a LED light power module 204, a camera power module 107, and to an output connector 209 via connection 211. In some configurations the connection 202 and 211 can share the same connections. A LED Light illumination module 105, consisting of at least one LED is connected to the LED power module 204 from one side and to the LED control connector 106. The LED module 105 is assembled in such way, that the LEDs are mounted on the housing 200 so their corresponding light emitting parts are facing outside of the housing. The individual LEDs in module 105 can be arranged in circular, linear or any other configuration, based on the particular application. The LED module 105 may comprise a constant current module which is to provide a constant current to the individual LEDs and thus to provide a constant illumination. The camera power module 107 is connected to the camera power output connector 108.

The example of FIG. 2 operates similar to the description of FIG. 1. The integrated power and data stream, transmitted via a single coaxial cable from the host computer with the standard CXP is received from connector 201. The power extraction module 203 senses the voltage coming from the controller/computer and converts it to a DC source voltage with a predetermined value—24V for example. The actual value depends on the particular camera and LED illuminator 105 configuration. The data is transmitted directly to output connector 209 and sent to the camera. The LED power module 204 converts the incoming source voltage from module 203 to a voltage suitable for the LED Illuminator 105—typically 20V. The LED Illuminator 105 converts the converted voltage to light with at least one LED. The spectrum of the irradiated light depends on the particular application and can be UV, Visible or IR. The LED control connector 106 can provide an external signal which can modulate the light intensity by controlling the current flowing into LEDs, switching the ON or OFF, or using Pulse Width Modulation (PWM) approach. The camera power module 107 converts the incoming source voltage from module 203 to a voltage suitable for the camera operation—typically 12V. In some configurations the modules 204 and 107 can be integrated in one module or directly integrated individually or together in the module 203. The actual voltages generated by the modules 203, 204 and 107 can be selected based on the particular application. The output voltage generated in module 107 is supplied to the camera via connector 209. In some configurations, the camera power module 107 can serve as a CXP voltage injector and the camera voltage can be injected into the data signal thus forming a new CXP steam which will provide a second integrated power and data stream to the camera.

Figure 3:
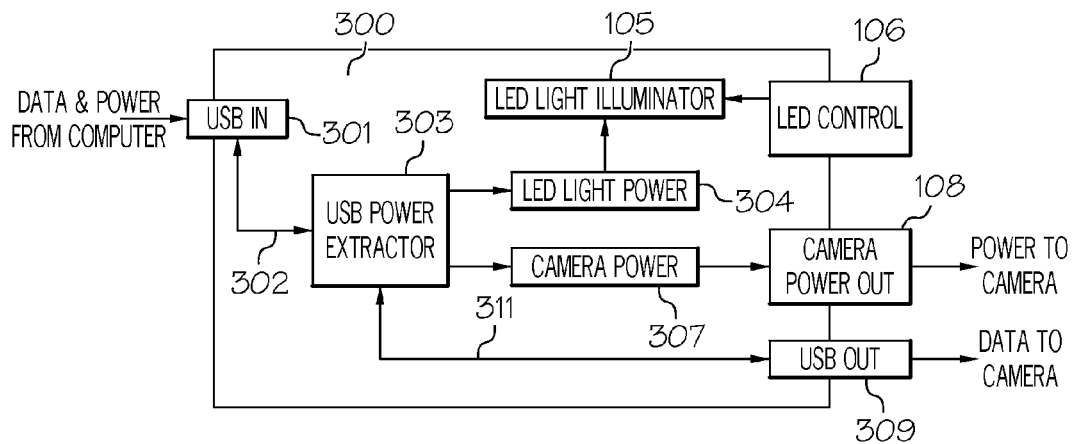
FIG. 3 shows a block diagram of a light illumination apparatus where the interface between the computer and the camera is USB.

FIG. 3 shows a block diagram of a light illumination apparatus where the interface between the computer and the camera is USB. FIG. 3 shows an example which is similar in structure to the block diagram shown in FIG. 1. In FIG. 3, like parts, which correspond to those in FIG. 1, are marked with the same reference numbers. In this modified design, a first USB connector 301 is connected to a light illuminator housing 300. A second USB connector 309 is also connected to the light illuminator housing 300. A third camera power connector 108 and a LED control connector 106 are also connected to the housing 300. Connectors 106 and 108 can share the same physical connector. A USB extractor module 303 is connected form one side to the connectors 301 via connection 302, and to a LED light power module 304, a Camera power module 307, and to an output connector 309 via connection 311. In some configurations the connection 302 and 311 can share the same connections. A LED Light illumination module 105, consisting of at least one LED is connected to the LED power module 304 from one side and to the LED control connector 106. The LED module 105 is assembled in such way, that the LEDs are mounted on the housing 300 so their corresponding light emitting parts are facing outside of the housing. The individual LEDs in module 105 can be arranged in circular, linear or any other configuration, based on the particular application. The LED module 105 may comprise a constant current module which is to provide a constant current to the individual LEDs and thus to provide a constant illumination. The camera power module 307 is connected to the camera power output connector 108.

The description according to FIG. 3 operates similar to the description of FIG. 1. The integrated power and data stream, transmitted via a single coaxial cable from the host computer with the standard USB is received from connector 301. The USB can be USB 2.0, USB 3.0, USB 3.0 Vision or any other USB standard. The power extraction module 303 senses the voltage coming from the computer and converts it to a DC source voltage with a predetermined value—5.0V for example. The actual value depends on the particular camera and LED illuminator 105 configuration. The data is transmitted directly to output connector 309 and sent to the camera. The LED power module 304 converts the incoming source voltage from module 303 to a voltage suitable for the LED Illuminator 105—typically 24V. The LED Illuminator 105 converts the converted voltage to light with the use of at least one LED. The spectrum of the irradiated light depends on the particular application and can be UV, Visible or IR. The LED control connector 106 can provide an external signal which can modulate the light intensity by controlling the current flowing into LEDs, switching the ON or OFF, or using Pulse Width Modulation (PWM) approach. The camera power module 307 converts the incoming source voltage from module 303 to a voltage suitable for camera operation—typically 12V. In some configurations the modules 304 and 307 can be integrated into one module or directly integrated individually or together in the module 303. The actual voltages generated by the modules 303, 304 and 307 can be selected based on the particular application. The output voltage generated in module 307 is supplied to the camera via connector 309. In some configurations, the camera power module 307 can serve as a USB voltage injector and the camera voltage can be injected into the data signal thus forming a new USB steam which will provide an integrated power and data to the camera.

Figure 4:
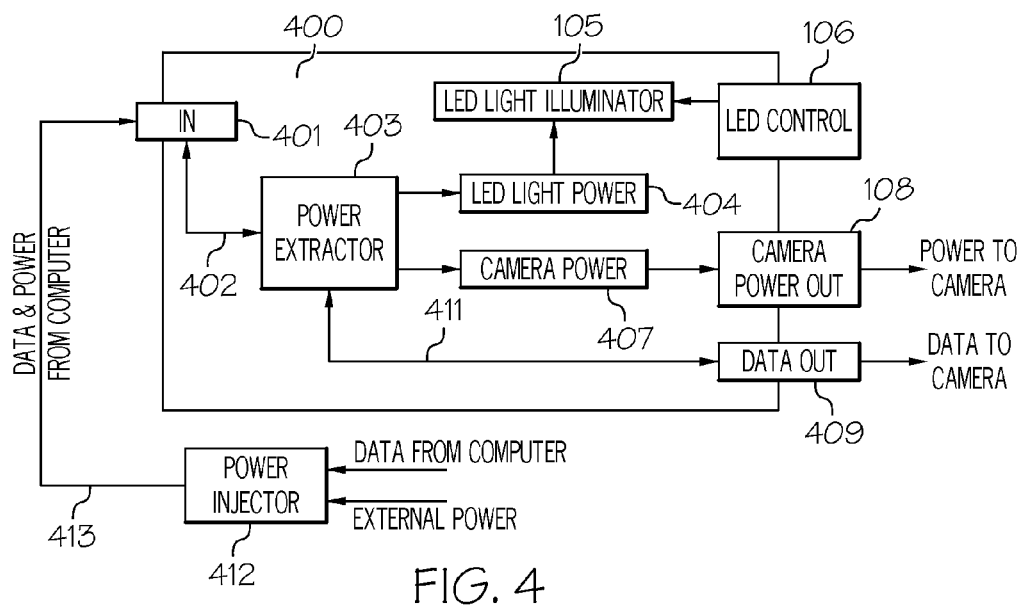
FIG. 4 shows a block diagram of a light illumination apparatus where the interface between the computer and the camera is generic integrated power and data stream.

FIG. 4 shows a block diagram of a light illumination apparatus where the interface between the computer and the camera is generic integrated power and data stream. FIG. 4 shows an example which is modified from and similar in structure to the description shown in FIG. 1. In FIG. 4, like parts, which correspond to those in FIG. 1, are marked with the same reference numbers. In this modified design a first connector 401 is connected to a light illuminator housing 400. A second connector 409 is also connected to the light illuminator housing 400. A camera power connector 108 and a LED control connector 106 are also connected to the housing 400. Connectors 106 and 108 can share the same physical connector. A power injection module 412, physically located outside of the illuminator housing 400 is connected to the first connector 401 via a cable 413. The power injector 412 has two inputs—one accepts the data from the host computer and the second accepts power from external power source. A voltage extractor module 403 is connected from one side to the connectors 401 via connection 402, and to a LED light power module 404, a Camera power module 407, and to an output connector 409 via connection 411. In some configurations the connection 402 and 411 can share the same connections. A LED Light illumination module 105, consisting of at least one LED is connected to the LED power module 404 from one side and to the LED control connector 106. The LED module 105 is assembled in such way, that the LEDs are mounted on the housing 400 so that their corresponding light emitting parts are facing outside of the housing. The individual LEDs in module 105 may be arranged in circular, linear or any other configuration, based on the particular application. The LED module 105 may include a constant current module that provides a constant current to the individual LEDs and thus provides a constant illumination brightness. The camera power module 407 is connected to the camera power output connector 108.

The example of FIG. 4 operates similar to the example of FIG. 1. The data from the controller/host computer is integrated with the external power in power injector 412 and the newly integrated power and data stream, transmitted via the cable 413 is received at connector 401. The data can be any standard or non-standard interface such as Analog, Camera link, GigE, FireWire (IEEE 1394), or any other data protocol. The power extraction module 403 senses the voltage coming from the computer and converts it to a DC source voltage with a predetermined value—28V for example. The actual value depends on the particular camera and LED illuminator 105 configuration. The data is transmitted directly to output connector 409 and sent to the camera. The LED power module 404 converts the incoming source voltage from module 403 to a voltage suitable for the LED Illuminator 105—typically 24V. The LED Illuminator 105 converts the converted voltage to light with at least one LED. The spectrum of the irradiated light depends on the particular application and can be UV, Visible or IR. The LED control connector 106 can provide an external signal which can modulate the light intensity by controlling the current flowing into LEDs, switching the ON or OFF, or using Pulse Width Modulation (PWM) approach. The camera power module 407 converts the incoming source voltage from module 403 to a voltage suitable for the camera operation—typically 12V. In some configurations the modules 404 and 407 can be integrated in one module or directly integrated individually or together in the module 403. The actual voltages generated by the modules 403, 404 and 407 can be selected based on the particular application. The output voltage generated in module 407 is supplied to the camera via connector 409. In some configurations, the camera power module 407 can serve as a voltage injector and the camera voltage can be injected into the data signal thus forming a new p and data steam which will provide an integrated power and data stream to the camera.

Possible modifications to the description herein include an example where The LED Light illuminator can comprise of LEDs with similar or different spectrum of irradiation. The LEDs can be arranged in one or several circular patterns, one or several linear patterns or any arbitrary arrangement. The light illumination module 105 can include similar or different light emitting devices, such as light bulbs, laser sources, gas discharge tubes, fluorescent tubes, or any other light emitting devices. The LED control may be omitted or integrated into the data stream. The LED control may be wire or wireless—using Wi-Fi wireless, Bluetooth, optical, RF or other wireless means. The Power extractor module, the LED Light power module and the Camera power module may be integrated in one or two modules, depending on the application. The Camera power connector, the LED control connector, the Data in connector, the Data out connector may be integrated in or more connectors. Furthermore, the connectors described herein may be any type of connector, including removable plugs and sockets at ends of cables, electronic, magnetic and/or optical interfaces at ends of cables and soldering of cable wiring directly to circuit boards.

The description herein also includes a light illumination apparatus where the power for the illumination device and the camera is provided directly from the power integrated into the data input cable between the computer and the light illumination device. The light illumination apparatus includes at least one input connector to accept the first integrated power and data steam, at least one output connector to provide the second data and power stream to the camera, a light illumination module comprising of at least one light emitting device, a power extraction module to separate the power and the data and to convert the power to the appropriate voltage for the camera and the light illumination module. The first data steam may be GigE with PoE, CXP or USB. The power extraction module may include a camera power module to provide the required voltage to the camera and a light power module to provide the required voltage to the said light illumination module. The light emitting device may be LED, light bulb, laser, gas discharge tube, fluorescent tube, or any other light emitting device. The light emitting device irradiates in the Visible, UV or IR spectral regions. The light emitting devices in the said light illumination module may be arranged in at least one circular, linear or any arbitrary pattern. The light illumination module has a capabilities to control the intensity of said light emitting devices, and the control of the intensity of the said light emitting devices may be provided via wire or wireless—using Wi-Fi wireless, Bluetooth, optical, RF or other wireless means. The output connector may comprise at least one data connector to provide the data to the camera and at least one power connector to provide the power to the camera. And a method for powering the light illuminator using the power provided from the data stream is presented in the description.

Figure 5:
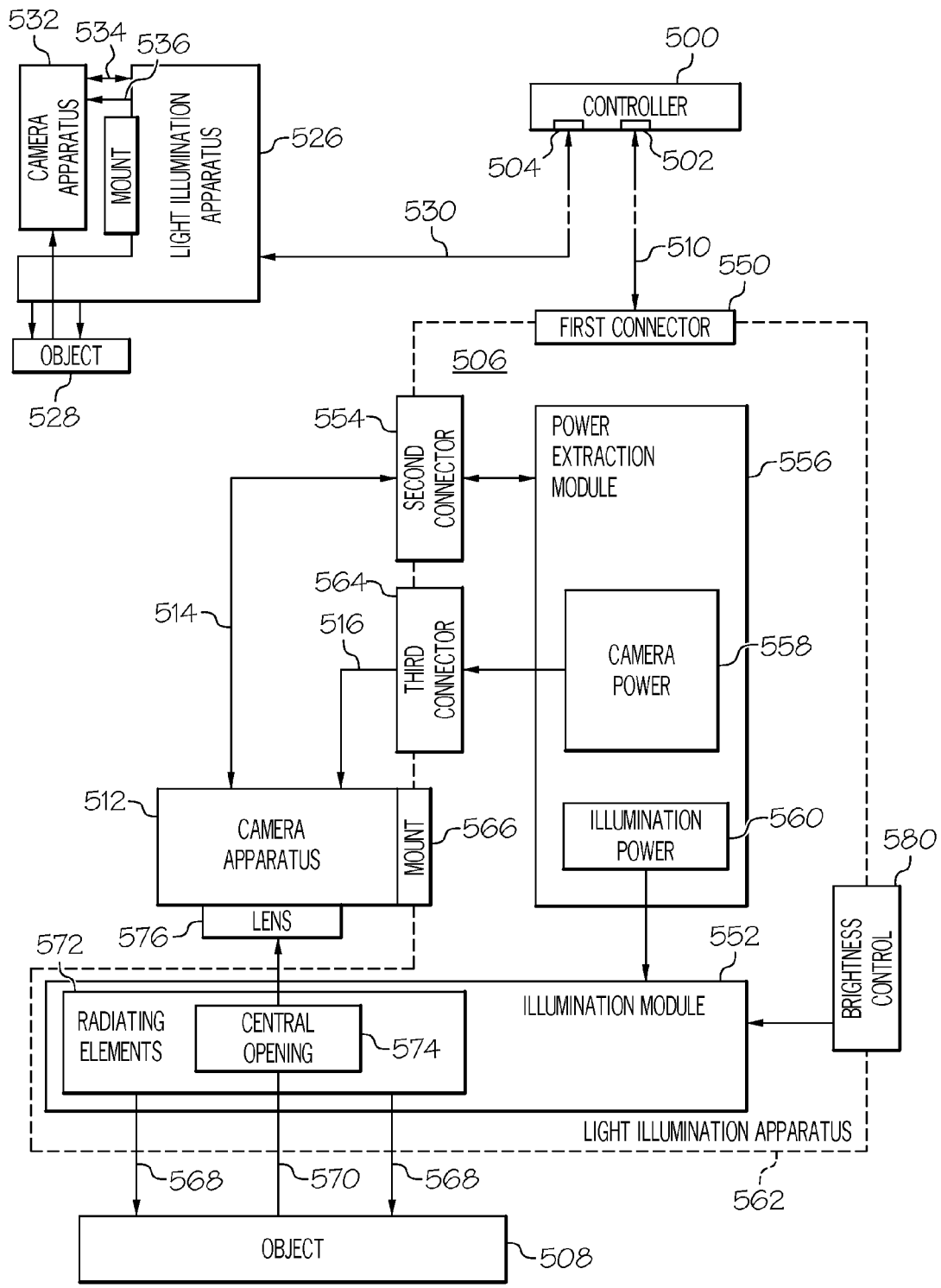
FIG. 5 shows a block diagram of a system including an external controller, a plurality of light illumination apparatuses and a plurality of external cameras.

FIG. 5 shows a block diagram of a system including an external controller, a plurality of light illumination apparatuses and a plurality of external camera apparatuses. An external controller 500 has a first controller connector 502 having a first integrated power and data stream which may be a GigE with PoE, CXP, USB or other integrated data and power stream, and a second controller connector 504 having a second integrated power and data stream.

A first light illumination apparatus 506 is coupled to the first controller connector 502 and adapted to illuminate a first object 508 by consuming a first portion of first power received from the first integrated power and data stream, and to generate a first camera power by consuming a second portion of first power received from the first integrated power and data stream. A first long cable 510 connects the first integrated power and data stream between the first controller connector 502 and the first light illumination apparatus 506. The first long cable may have a length up to and/or exceeding 100 meters. A first camera apparatus 512 is coupled to the first light illumination apparatus 506 and generates a digitized first image of the first object 508 illuminated by the first light illumination apparatus 506 by consuming the first camera power received from the first light illumination apparatus. A first short data cable 514 couples a first data stream component of the first integrated power and data stream between the first camera apparatus 512 and the first light illumination apparatus 506. The first camera apparatus 512 modulates the digitized first image upon the first data stream component for communication to the external controller 500. A first short power cable 516 couples the first camera power from the first light illumination apparatus to the first camera apparatus. In one example, the first short data cable and the first short power cable may have a length of 0.25 meters, thus the length of the first long cable is at least one hundred times greater, if not four hundred times greater than the length of the first short power cable.

A second light illumination apparatus 526 is coupled to the second controller connector 504 and adapted to illuminate a second object 528 by consuming a first portion of second power received from the second integrated power and data stream, and to generate a second camera power by consuming a second portion of second power received from the second integrated power and data stream. A second long cable 530 connects the second integrated power and data stream between the second controller connector 504 and the second light illumination apparatus 526. The second long cable may have a length of up to and/or exceeding 100 meters. A second camera apparatus 532 is coupled to the second light illumination apparatus 526 and generates a digitized second image of the second object 528 illuminated by the second light illumination apparatus 526 by consuming the second camera power received from the second light illumination apparatus. A second short data cable 534 couples a second data stream component of the second integrated power and data stream between the second camera apparatus 532 and the second light illumination apparatus 526. The second camera apparatus 532 modulates the digitized second image upon the second data stream component for communication to the external controller 500. A second short power cable 536 couples the second camera power from the second light illumination apparatus to the second camera apparatus. In one example, the second short data cable and the second short power cable may have a length of 0.20 meters, thus the length of the second long cable is at least one hundred times greater, if not five hundred times greater than the length of the second short power cable. In another example the length of a long cable 510 or 530 may be a standard one meter USB cable with a short cable 514, 516, 534 or 536 being as long as a quarter of a meter. In this example the length of a long cable is a little as four times (or more) greater than the length of a long cable. In another example the length of a long cable 510 or 530 may be a standard two meter USB3, CPX or GEV cable with a short cable 514, 516, 534 or 536 being standard 0.3 meter cable. In this example the length of a long cable is a six and two thirds times greater than the length of a long cable. Thus, in these examples, the length of a long cable is substantially greater than the length of a short cable with a long cable being between four and five hundred times longer than the length of a short cable.

The system of FIG. 5 shows two light illumination apparatuses coupled to two camera apparatuses. Cables 510 and 530 may be 100 meters in length, thus the two light illumination apparatuses coupled to two camera apparatuses may be separated by a distance between 100 meters and 200 meters, corresponding to a distance exceeding one hundred meters in a manufacturing or other environment, depending upon the implementation of the manufacturing environment. The distance between the two light illumination apparatuses coupled to two camera apparatuses may depend upon the length of cables 510 and 530, and the distance may be at most the total length of cables 510 and 530. Nevertheless, the arrangement allows for the first light illumination module is separated from the second light illumination module by a distance exceeding the length of the shorter of the first long cable and the second long cable. For example, the length of the first long cable is 10 meters and the length of the second long cable is twenty meters, the system allows for the distance between the two light illumination apparatuses coupled to two camera apparatuses to exceed ten meters, which is the length of the first long cable, the first long cable being the shorter of the first long cable and the second long cable. In another example, only one light illumination/camera apparatuses may be coupled to the controller. In other examples, three or more light illumination/camera apparatuses may be coupled to the controller, each light illumination/camera apparatuses coupled to the controller with a single long cable. The system shows a potential advantage of eliminating two of three long cables between the controller and each light illumination/camera apparatus. A first of the three long cables would provide power from the controller to the light illumination apparatus, a second of the three long cables would provide power from the controller to the camera apparatus, and a third of the three long cables would communicate a data stream between the camera apparatus and the controller.

FIG. 5 also shows details of a components of a light illumination apparatus 506. A first connector 550 is configured to receive an integrated power and data stream from an external controller, the integrated power and data stream having a source power component at a source voltage combined with a data stream component on a conductor of the first connector. For example, a CPX integrated power and data stream may include both the source power and the data stream component on a single center conductor of the first coax connector. In another example, a GigE with PoE integrated power and data stream may include both the source power and the data stream component on a multiple contacts of an RJ45 connector. Illumination module 552 generates light upon receiving a first power component at a first voltage and may correspond to illumination module 105. A second connector 554 communicates the data stream component with the external camera apparatus 512 for modulating the data stream component with a digital representation of a received image upon receiving operating power from a second power component.

Power extraction module 556 may be functionally similar to modules 103, 203, 303 and 403, and is coupled to the first connector 550, the second connector 554, and the illumination module 552. The power extraction module 556 extracts the source power component from the integrated power and data stream, and the data stream component from the integrated power and data stream, and communicates the data stream component between the first connector 550 and the second connector 554. Additionally, power extraction module 556 includes camera power module 558 which may be functionally similar to modules 107, 307, and 407 and functions to convert a first portion of the source power component to the first power component at the first voltage, and then provides the first power component to the illumination module. Additionally power extraction module 556 includes an illumination power module 560 which may be functionally similar to modules 104, 204, 304, and 404. Illumination power module 560 supplies a second portion of the source power component to the second power component, and provides the second power component to the external camera apparatus 512. In one example, modules 558 and 560 may be at least partially comprised within a common power conversion integrated circuit. Also illumination power module 560 may provide a regulated current source for illumination module 552 wherein the second voltage produced by the illumination power module is a function of the regulated current source and the electrical load of the illumination module.

Light illumination apparatus 506 is housed within a housing 562 which houses the first connector 550, the illumination module 552, the second connector 554, and the power extraction module 556.

In one example implementation (not shown), the power extraction module 556 is further adapted to combine the second power component with the data stream component via the camera power module 558 to produce a second integrated power and data stream, and provide a second integrated power and data stream to the second connector 554, thereby providing the data stream component and the second power component to the external camera apparatus through the second connector 554.

In the example implementation shown in FIG. 5, the light illumination apparatus 506 further includes a third connector 564 housed by the housing 562 and coupled to the camera power module 558 of the power extraction module 556, wherein the second power component is provided to the external camera apparatus 512 through the third connector 564. The power extraction module further supplies the second portion of the source power component to the second power component by converting the second portion of the source power component to the second power component at a second voltage, wherein the source voltage is different from the first voltage and the second voltage, and the second voltage is different from the first voltage.

The housing 562 further includes a mount 566 adapted to removably affix the external camera apparatus 512 to the light illumination apparatus 506. The mount may be any approach to removably attaching the external camera apparatus 512 to the light illumination apparatus 506 while remaining within the scope of this description and may include interlocking surfaces and fasteners known to those familiar with the art. The illumination module 552 generates light which radiates in a radiation direction 568. The external camera apparatus 512 captures images received in a viewing direction 570. The mount 566 aligns the radiation direction 568 and the viewing direction 570. This arrangement not only provides for improved illumination and capturing of images by assuring alignment of the radiation and viewing directions, but also fixes distances between the camera apparatus 512 and the second and third connectors 554 and 564. Contrary to long distance routing of cable 510, the fixed distances allow for cables 514 and 516 to be made predictable short.

The illumination module 552 includes a multiplicity of regularly arranged light radiating elements 572 having an aperture or central opening 574 and the external camera apparatus 512 has a lens 576 for receiving images, The mount 566 positions the lens 576 in the central opening 574. In one example, the multiplicity of light radiating elements 572 are organized into a circular arrangement and the central opening 574 corresponds to at a center of the circular arrangement. In another example, the multiplicity of light radiating elements 572 are organized into a linear arrangement such as one or more rows of radiating elements, and the central opening corresponds to one of a center of the linear arrangement and a perpendicular offset from the center of the linear arrangement. Thus the rows of elements may have a central opening for accepting the lens, or the rows of elements may be continuous and the central opening located at the center of the length of the rows but perpendicularly offset beyond the rows thereby allowing the rows to comprise regularly spaced lighting elements. Other arrangements of lighting elements may be utilized while remaining within the scope of this description.

In another example implementation, the light illumination apparatus is able to provide camera power both at the third connector 564 and as a second integrated power and data stream at second connector 554. This implementation has the potential advantage of enabling the light illumination apparatus to interface to a variety of different camera apparatuses while interfacing with the controller using a single long cable 510. For example a first camera apparatus may have a single connector for accepting an integrated power and data stream separate data stream while a second camera apparatus may have a one connector for accepting power and another connector for accepting the data stream. Either camera apparatus may be readily installed or replaced (if defective for example) in a production or manufacturing environment well after the light illumination module 506 has been installed and the long cable 510 routed through the production environment. Thus, if the first camera apparatus fails, it may be quickly replaced with the second camera apparatus without having to route additional power cabling through the production environment for the second camera.

In this example of the light illumination apparatus, the second power component has a first element having a first element voltage corresponding to the source voltage and a second element having a second element voltage different from the source voltage, and the power extraction module further combines the first element of the second power component with the data stream component to produce a second integrated power and data stream, and apply the second integrated power and data stream to the second connector 554, thereby providing the second power component to the external camera apparatus through the second connector. Furthermore, the illumination apparatus further comprises the third connector 564 housed by the housing 562 and coupled to the power extraction module 556 wherein the second element of the second power component is available to the external camera apparatus through the third connector 564, and the power extraction module further supplies the second portion of the source power component to the second element of the second power component by converting the second portion of the source power component to the second power component at a second voltage. The source voltage may be different from the first voltage and the second voltage, and the second voltage is different from the first voltage. This arrangement enables provision of the second power component to the external camera either through the second connector at the source voltage or the third connector at the second voltage.

Example of the light illumination apparatus include any format of the integrated power and data stream including one of GigE with PoE, CXP, and USB. Furthermore, the illumination module includes an at least one illumination element for converting the first power component into light, the at least one illumination element comprised of one of an LED, an incandescent light bulb, a laser, a gas discharge tube, and a fluorescent tube. The illumination module includes an at least one illumination element for converting the first power component into light, wherein the light is included within at least one of an infrared spectrum, a visible spectrum and an ultraviolet light spectrum.

The light illumination apparatus 506 further comprises an illumination brightness controller 580 coupled to the illumination module 552 and able to adjust a brightness of the light generated by the illumination module based upon a brightness signal. The illumination brightness controller 580 may be functionally similar to LED control 106 and may include at least one of a manual input device including one of: a switch, a plurality of switches and a rotary knob for receiving the brightness signal based upon a manual input; a wireless module including one of a RF module, a WiFi module and a Bluetooth module for receiving the brightness signal based upon a wireless signal from an external brightness controller; and a connector including one of for receiving the brightness signal based upon one of a wired signal and an optical signal received from the external brightness controller. In other examples the bright signal for the brightness controller 580 may be received from controller 500 through the first connector 550, or from the external camera apparatus 512 through the second connector 554 or the third connector 564. Other methods of generating and or receiving a brightness signal and adjusting brightness are considered to be within the scope of this description.

Figure 6:
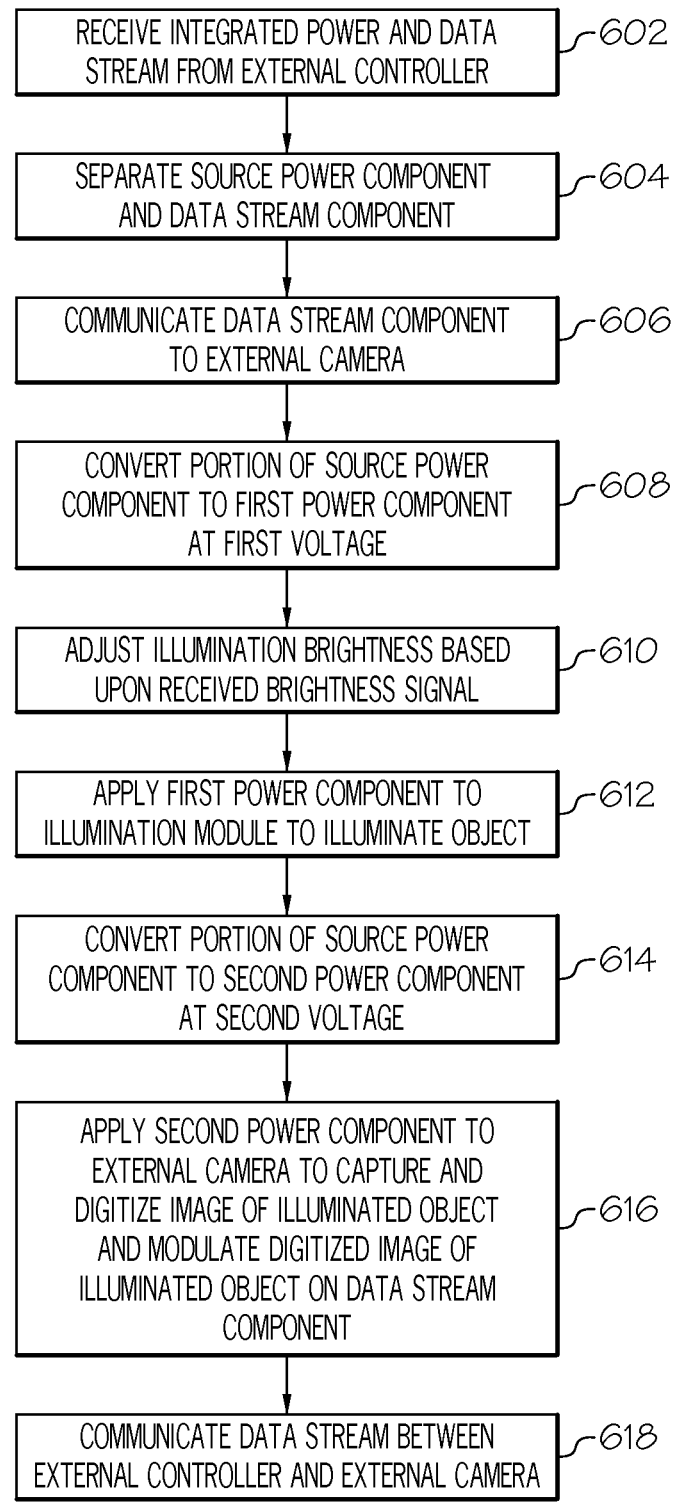
FIG. 6 shows an example flow diagram of a process operating within a light illumination apparatus with integrated power provision.

FIG. 6 shows an example flow diagram of a process operating within a light illumination apparatus with integrated power provision. The method is performed within the housing of the light illumination apparatus. At step 602, the method receives an integrated power and data stream from an external controller at a first connector of the light illumination apparatus. The format of the integrated power and data stream includes one of GigE with PoE, CXP, and USB, of other integrated power and data stream approach. The integrated power and data stream has a source power component at a source voltage and a data stream component. The source power component and the data stream component are integrated are present on a conductor of the first connector. At step 604, the method separates the source power component and the data stream component from the integrated power and data stream. At step 606 the method communicates the data stream component to a second connector for coupling the data stream component to an external camera apparatus. At step 608 the method converts a first portion of the source power component to a first power component at a first voltage, and applies the first power component to an illumination module for illuminating an object at step 612. The illumination brightness may be adjusted based upon a received brightness signal at step 610. Step 614 of the method converts a second portion of the source power component to a second power component at a second voltage different from the first voltage and different from the source voltage and applies the second power component to the external camera apparatus at step 616. The external camera apparatus is able to receive an image of the object, produce a digitized image of the object, and modulate the digitized image of the object upon the data stream component. At step 618 the method communicates the data stream component including the digitized image of the object from the second connector to the first connector.

As previously described, one example of the method allow for combining the second power component with the data stream component to generate a second integrated power and data stream, wherein the communicating the data stream component to the second connector includes coupling the second integrated power and data stream to the external camera apparatus.

In another previously described example of the method, the light illumination apparatus further comprises a third connector, and the providing further includes applying the second power component to the third connector for coupling the second power component to the external camera apparatus. Furthermore, the method optionally allows for combining the second power component with the data stream component to generate a second integrated power and data stream, wherein the communicating the data stream component to the second connector includes coupling the second integrated power and data stream to the external camera apparatus, thereby providing camera power on both the second connector as a second integrated power and data stream and the third connector as the second power component. This allows a light illumination apparatus to interface to either a camera that accepts an integrated power and data stream on a single connector, or a separate power component on one connector and a separate data stream on another connector thereby providing the potential advantage of increasing a flexibility of implementing and or maintaining a vision based manufacturing or production system.

Potential benefits of the present description include providing a light illumination apparatus that facilitates a single long cable from an external controller to illumination and camera apparatuses utilizing a short power cable and a short data cable between the light illumination apparatus and the external camera apparatus. Since the camera apparatus is external to the light illumination apparatus, a desired camera apparatus may be configured with any of several types of light illumination apparatuses. The light illumination element configuration (circular, linear or otherwise) and spectrum (infrared, visible or ultraviolet) associated with the external camera element may be adjusted to the application of the camera and manufacturing application by selecting and installing a desired light illumination apparatus, while maintaining the potential benefit of reduced cabling requirements. Furthermore for cameras that do not support integrated power and data stream cabling, the light illumination apparatus functions to convert an integrated power and data stream communicated through a long cable to a separate data stream and a separate power component communicated through short cables, thereby adapting the camera to the integrated power and data stream application while providing for illumination of objects recorded by the camera and supporting a single long cable from the controller/host computer. Furthermore, the light illumination apparatus has a mount that advantageously locates the lens of the external camera relative to the illumination module, for example in the central opening of a circular illumination module.

The principles of the description have been described with reference to the described examples. Modifications and variations could occur to those upon reading and understanding the preceding detailed description. It is intended that the scope of the claims be construed as including all such modifications and alterations insofar as they come within the scope of the appended claims or equivalents thereof.

The description of the present application has been presented for purposes of illustration and description, but is not intended to be exhaustive or limited to the description in the form disclosed. Many modifications and variations will be apparent without departing from the scope of the description. The examples were chosen and described in order to best explain the principles of the description and the practical application, and to enable the understanding of the description for various examples with various modifications as are suited to the particular use.

What is claimed is:

1. A light illumination apparatus comprising:
    a first connector adapted to receive an integrated power and data stream from an external controller, the integrated power and data stream having a source power component at a source voltage combined with a data stream component on a conductor of the first connector;
    an illumination module generating light upon receiving a first power component at a first voltage;
    a second connector adapted to communicate the data stream component with an external camera apparatus for modulating the data stream component with a digital representation of a received image upon receiving operating power from a second power component;
    a power extraction module coupled to the first connector, the second connector, and the illumination module, the power extraction module adapted to
        extract the source power component from the integrated power and data stream,
        extract the data stream component from the integrated power and data stream,
        communicate the data stream component between the first connector and the second connector,
        convert a first portion of the source power component to the first power component at the first voltage,
        apply the first power component to the illumination module,
        supply a second portion of the source power component to the second power component,
        provide the second power component to the external camera apparatus; and
    a housing adapted to house the first connector, the illumination module, the second connector, and the power extraction module.

2. The light illumination apparatus of claim 1 wherein the power extraction module is further adapted to
    combine the second power component with the data stream component to produce a second integrated power and data stream, and
    apply the second integrated power and data stream to the second connector, thereby providing the data stream component and the second power component to the external camera apparatus through the second connector.

3. The light illumination apparatus of claim 1 further comprising
    a third connector housed by the housing and coupled to the power extraction module, wherein
    the second power component is provided to the external camera apparatus through the third connector, and
    the power extraction module further supplies the second portion of the source power component to the second power component by converting the second portion of the source power component to the second power component at a second voltage, wherein
    the source voltage is different from the first voltage and the second voltage, and the second voltage is different from the first voltage.

4. The light illumination apparatus of claim 1 wherein
    the housing further includes a mount adapted to removably affix the external camera apparatus to the light illumination apparatus,
    the illumination module generates light which radiates in a radiation direction,
    the external camera apparatus captures images received in a viewing direction, and
    the mount aligns the radiation direction and the viewing direction.

5. The light illumination apparatus of claim 1 wherein
    the housing further includes a mount adapted to removably affix the external camera apparatus to the light illumination apparatus,
    the illumination module includes a multiplicity of regularly arranged light radiating elements having a central opening,
    the external camera apparatus has a lens for receiving images, and
    the mount is adapted to position the lens in the central opening.

6. The illumination apparatus of claim 5 wherein the multiplicity of light radiating elements are organized into a circular arrangement and the central opening corresponds to at a center of the circular arrangement.

7. The illumination apparatus of claim 5 wherein the multiplicity of light radiating elements are organized into a linear arrangement and the central opening corresponds to one of a center of the linear arrangement and a perpendicular offset from the center of the linear arrangement.

8. The light illumination apparatus of claim 1 wherein
    the second power component has
        a first element having a first element voltage corresponding to the source voltage and
        a second element having a second element voltage different from the source voltage, and
    the power extraction module is further adapted to
        combine the first element of the second power component with the data stream component to produce a second integrated power and data stream, and
        apply the second integrated power and data stream to the second connector, thereby providing the second power component to the external camera apparatus through the second connector, and
    the illumination apparatus further comprises a third connector housed by the housing and coupled to the power extraction module wherein the second element of the second power component is available to the external camera apparatus through the third connector, and the power extraction module further supplies the second portion of the source power component to the second element of the second power component by converting the second portion of the source power component to the second power component at a second voltage, wherein the source voltage is different from the first voltage and the second voltage, and the second voltage is different from the first voltage, thereby enabling provision of the second power component to the external camera either through the second connector at the source voltage or the third connector at the second voltage.

9. The light illumination apparatus of claim 8 wherein the housing further includes a mount adapted to removably affix the external camera apparatus to the light illumination apparatus, the illumination module generates light which radiates in a radiation direction, the external camera apparatus captures images received in a viewing direction, and the mount aligns the radiation direction and the viewing direction.

10. The light illumination apparatus of claim 1 wherein a format of the integrated power and data stream includes one of GigE with PoE, CXP, and USB.

11. The light illumination apparatus of claim 1 wherein the illumination module includes an at least one illumination element for converting the first power component into light, the at least one illumination element comprised of one of an LED, an incandescent light bulb, a laser, a gas discharge tube, and a fluorescent tube.

12. The light illumination apparatus of claim 1 wherein the illumination module includes an at least one illumination element for converting the first power component into light, wherein the light is included within at least one of an infrared spectrum, a visible spectrum and an ultraviolet light spectrum.

13. The light illumination apparatus of claim 1 further comprising an illumination brightness controller coupled to the illumination module and adapted adjust a brightness of the light generated by the illumination module based upon a brightness signal.

14. The light illumination apparatus of claim 13 wherein the illumination brightness controller includes at least one of a manual input device including one of
  a switch,
  a plurality of switches and
  a rotary knob for receiving the brightness signal based upon a manual input,
a wireless module including one of
  a RF module,
  a WiFi module and
  a Bluetooth module for receiving the brightness signal based upon a wireless signal from an external brightness controller, and
a connector for receiving the brightness signal based upon one of
  a wired signal and
  an optical signal received from the external brightness controller.

15. A system comprising:

an external controller having a first controller connector having a first integrated power and data stream, and a second controller connector having a second integrated power and data stream;

a first light illumination apparatus coupled to the first controller connector and adapted to illuminate a first object by consuming a first portion of first power received from the first integrated power and data stream, and to generate a first camera power by consuming a second portion of first power received from the first integrated power and data stream;

a first long cable for coupling the first integrated power and data stream between the first controller connector and the first light illumination apparatus;

a first camera apparatus coupled to the first light illumination apparatus and adapted to generate a digitized first image of the first object illuminated by the first light illumination apparatus by consuming the first camera power received from the first light illumination apparatus;

a first short data cable for coupling a first data stream component of the first integrated power and data stream between the first camera apparatus and the first light illumination apparatus, the first camera apparatus further adapted to modulate the digitized first image upon the first data stream component for communication to the external controller;

a first short power cable for coupling the first camera power from the first light illumination apparatus to the first camera apparatus, wherein a length of the first long cable is substantially greater than a length of the first short power cable;

a second light illumination apparatus coupled to the second controller connector and adapted to illuminate a second object by consuming a first portion of second power received from the second integrated power and data stream, and to generate second camera power by consuming a second portion of second power received from the second integrated power and data stream;

a second long cable for coupling the second integrated power and data stream between the second controller connector and the second light illumination apparatus;

a second camera apparatus coupled to the second light illumination apparatus and adapted to generate a digitized second image of the second object illuminated by the second light illumination apparatus by consuming the second camera power received from the second light illumination apparatus;

a second short data cable for coupling a second data stream component of the second integrated power and data stream between the second camera apparatus and the second light illumination apparatus, the second camera apparatus adapted to modulate the digitized second image upon the second data stream component for communication to the external controller; and a second short power cable for coupling the second camera power from the second light illumination apparatus to the second camera apparatus, wherein a length of the second long cable is substantially greater than a length of the second short power cable and the first light illumination module is separated from the second light illumination module by a distance exceeding the length of the shorter of the first long cable and the second long cable.

16. A method performed within a housing of a light illumination apparatus, the method comprising:
- receiving an integrated power and data stream from an external controller at a first connector of the light illumination apparatus, the integrated power and data stream having a source power component at a source voltage and a data stream component, the source power component and the data stream component integrated on a conductor of the first connector;
- separating the source power component and the data stream component from the integrated power and data stream;
- communicating the data stream component to a second connector for coupling the data stream component to an external camera apparatus;
- converting a first portion of the source power component to a first power component at a first voltage;
- applying the first power component to an illumination module for illuminating an object;
- converting a second portion of the source power component to a second power component at a second voltage;
- providing the second power component to the external camera apparatus, the external camera apparatus able to receive an image of the object, produce a digitized image of the object, and modulate the digitized image of the object upon the data stream component; and
- communicating the data stream component including the digitized image of the object from the second connector to the first connector.

17. The method according to claim 16 further comprising combining the second power component with the data stream component to generate a second integrated power and data stream, wherein
the communicating the data stream component to the second connector includes coupling the second integrated power and data stream to the external camera apparatus.

18. The method according to claim 16 wherein the light illumination apparatus further comprises a third connector, and the providing further includes
applying the second power component to the third connector for coupling the second power component to the external camera apparatus.

19. The method of claim 16 wherein a format of the integrated power and data stream includes one of GigE with PoE, CXP, and USB.

20. The method of claim 16 further comprising:
receiving an externally generated brightness signal; and
adjusting a brightness of the illuminating of the object based upon the brightness signal.

* * * * *